United States Patent [19]

Klimo

[11] Patent Number: 4,511,825
[45] Date of Patent: Apr. 16, 1985

[54] ELECTRIC WHEELCHAIR WITH IMPROVED CONTROL CIRCUIT

[75] Inventor: Robert G. Klimo, Parma, Ohio
[73] Assignee: Invacare Corporation, Elyria, Ohio
[21] Appl. No.: 351,990
[22] Filed: Feb. 24, 1982

Related U.S. Application Data

[63] Continuation-in-part of Ser. No. 254,443, Apr. 15, 1981, Pat. No. 4,387,325.

[51] Int. Cl.³ ............................................ B62D 11/04
[52] U.S. Cl. ....................................... 318/67; 318/77; 318/628; 180/65
[58] Field of Search ..................... 318/67, 68, 628, 77; 180/6.5, DIG. 3

[56] References Cited

U.S. PATENT DOCUMENTS

| | | |
|---|---|---|
| 3,629,633 | 12/1971 | O'Callaghan . |
| 3,683,253 | 8/1972 | Rummel et al. . |
| 3,814,199 | 6/1974 | Jones .................................. 318/587 |
| 3,970,160 | 7/1976 | Nowick ........................... 318/67 X |
| 4,059,786 | 11/1977 | Jones et al. ........................... 318/17 |
| 4,079,301 | 3/1978 | Johnson . |
| 4,151,450 | 4/1979 | Fukuma et al. . |
| 4,157,123 | 6/1979 | Rodaway . |
| 4,166,238 | 8/1979 | Binner .................................. 318/67 |
| 4,291,260 | 9/1981 | Nixon . |
| 4,300,081 | 11/1981 | Van Landingham . |
| 4,303,874 | 12/1981 | Iwai . |
| 4,375,631 | 3/1983 | Goldberg ........................... 338/128 |

Primary Examiner—B. Dobeck
Attorney, Agent, or Firm—Fay & Sharpe

[57] ABSTRACT

The electric wheelchair includes a battery pack (A), a right drive motor (B), a left drive motor (C), and a control circuit for controlling the amount of power supplied from the battery to the left and right control motors. A speed potentiometer (24) and a direction potentiometer (26) are connected with a joystick (22) for producing a selected vehicle speed signal and a selected vehicle direction signal, respectively. A right speed control circuit (E) and a left speed control circuit (F) receive the selected vehicle speed and direction signals and control the right and left motors in accordance with them. Each speed control circuit includes a reference signal circuit (90) which receives the selected vehicle speed and direction signals and produces a reference signal whose magnitude varies with the speed selected for its motor. The voltage and current across the armature of the motor are detected as measures of the motors actual speed. A comparing circuit (92) compares the actual speed as determined by the armature voltage and current with the selected speed as denoted by their reference signal. Specifically, it subtractively combines the armature voltage and the reference signal to produce a first difference signal. Further, it subtractively combines the first difference signal with the armature current signal to produce a speed error reference signal. The speed error reference signal controls a variable power regulator (94) which varies the amount of power supplied to the motor in a manner which tends to cause the actual and selected speeds to match.

12 Claims, 11 Drawing Figures

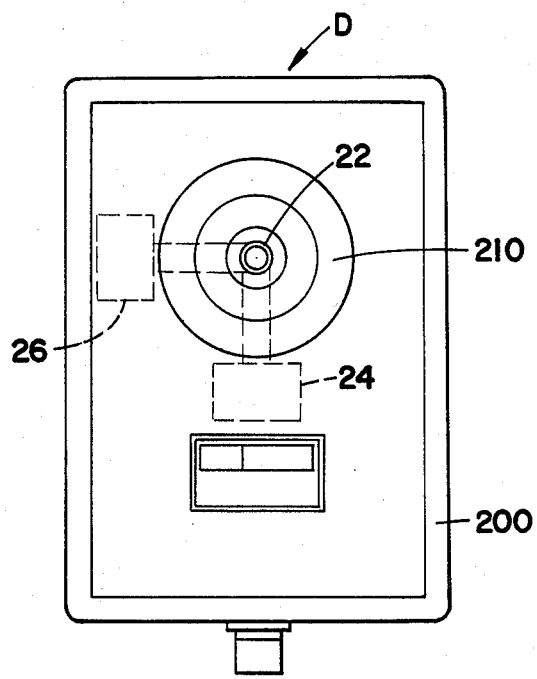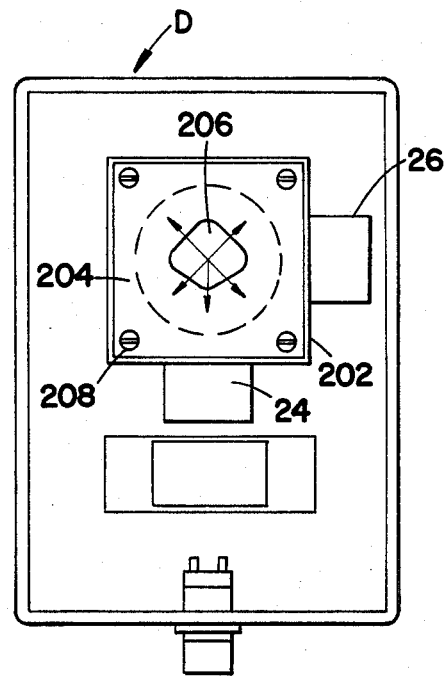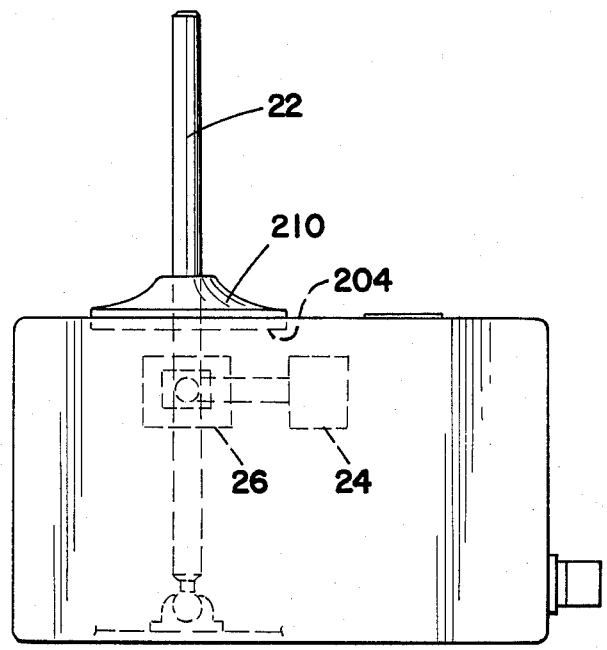
FIG. 5    FIG. 6
FIG. 7

ELECTRIC WHEELCHAIR WITH IMPROVED CONTROL CIRCUIT

BACKGROUND OF THE INVENTION

This application is a continuation-in-part of application Ser. No. 254,443 filed Apr. 15, 1981, now U.S. Pat. No. 4,387,325.

This application pertains to the art of electronic speed controls and more particularly to feedback speed controls. The invention finds particular application in controlling the speed of electric wheelchairs and will be described with particular reference thereto. It will be appreciated, however, that the invention has broader applications, such as controlling the speed of other motorized patient care devices, electric vehicles, machine tool motors, and the like.

Conventionally, electric wheelchairs are driven by a pair of permanent magnet, DC electric motors connected with their driving wheels. A battery pack is mounted in the wheelchair for supplying electric power to the motors. A joystick, which is mounted with easy manual access to the operator, controls the amount and polarity of the power which is supplied from the battery to each of the drive motors. To move and accelerate the wheelchair, the control circuit supplies power to the motors. To slow the wheelchair, the control circuit stops supplying power to the motors. When a permanent magnet DC motor coasts, it functions as a generator. Commonly, a resistor is connected across the coasting motors to dissipate the generated electrical energy and slow the motors. This braking effect, which is commonly denoted as dynamic braking, is increased as the size of the braking resistance is decreased.

An exemplary prior art wheelchair speed control is illustrated in U.S. Pat. No. 4,157,123, issued June 5, 1979 to Keith S. Rodaway. In the Rodaway patent, a manually operated joystick is surrounded by four on-off switches for independently applying power from the battery to the right and/or left wheel motors with either a forward or reverse polarity. The joystick can be tipped to actuate one of the switches for the right motor and/or one for the left motor. By operating the appropriate switches, the joystick can cause the chair to move forward, rearware, turn to the right, turn to the left, or pivot. When the joystick is not supplying power of either polarity to one or both of the motors, a power dissipating resistor is connected across that motor. To select the speed, a fast/slow switch is provided separate from the joystick.

One of the problems with the Rodaway circuit is that the speed of the wheelchair is affected by several uncontrolled factors. When the chair is proceeding downgrade, it will move faster and, when it is moving upgrade, it will move slower. Further, operating on-off switches rather than continuously variable switches, such as a potentiometer, with the joystick limits the selection of speed, handling, and performance. For example, there is a single turning radius for right and lefthand turns which, like the speed, varies if the chair is on a grade. Another problem is that the wheelchair can gain excessive speed on a downgrade, because the power to the motors and the connection of the braking resistor across the motors is controlled by the joystick position and not the actual speed.

Another exemplary prior art wheelchair control circuit is illustrated in U.S. Pat. No. 4,059,786, issued Nov. 22, 1977 to Michael Lloyd Jones et al. In the Jones patent, the speed of the wheelchair is controlled by a joystick which operates a potentiometer providing a continuously variable analog voltage indicative of the selected speed. A pulse width modulator converts the modulus of the potentiometer voltage into a proportionate amount of power for the driving motor. A reversing relay is provided for changing the polarity with which the power is provided to the motor for forward and reverse directions. Like the later Rodaway patent, the Jones et al. patent includes a dynamic braking resistor which is shunted across the motor to slow the wheelchair. The Jones circuit further has an armature voltage detector for enabling the forward/reverse relay to change states only when there is substantially no voltage across the armature, i.e., when the motor is stationary. An overload detector including a resistor in series with the power supply and the motor prevents an excessive amount of power from being supplied to the motor regardless of the position of the joystick.

One problem with the Jones control is that, like the Rodaway control, the amount of driving power supplied to each motor depends only on the joystick position. No accommodation is made for the actual speed of the chair. On uneven terrain, the speed and handling of the chair can become unpredictable and hard to control.

The present invention contemplates a new and improved speed control circuit which overcomes the above-referenced problems and others. It provides a speed control circuit which accurately holds the selected speed of a wheelchair even over uneven terrain.

SUMMARY OF THE INVENTION

In accordance with a first aspect of the present invention, there is provided a speed control circuit for an electric vehicle. The circuit includes a reference signal means for producing a reference signal whose magnitude varies with a selected motor speed. An oscillator produces an oscillating signal. A first pulse width modulator compares the magnitude of a signal received at its first input and a signal received at its second input. The first input is operatively connected with the reference signal means and the second input is operatively connected with the oscillator. The first pulse width modulator generates a first pulse train whose periodicity varies with the oscillating signal and whose pulse width varies with the reference and oscillating signal comparison. A second pulse width modulator compares the oscillating signal and the reference signal and generates a second pulse train whose pulses are generated alternately with the pulses of the first pulse train. A first transistor means supplies voltage to an armature of an electric motor for driving the vehicle. The first transistor means is gated periodically by the first pulse train. A second transistor means selectively connects the armature of the motor to ground. The second transistor means is gated by the second pulse train. In this manner, power supplied to the armature is limited to the voltage through the first transistor means and ground through the second transistor means and the speed is determined by the relative duration for which the first and second transistor means are gated. A unidirectional blocking means is operatively connected between the second pulse width modulator and the second transistor means for passing the second pulse train from the second pulse width modulator to the second transistor means and for blocking pulses from passing from the transistor means to the second pulse width modulator. In this manner, the second pulse width modulator is protected from transient noise.

In accordance with a second aspect of the invention there is provided an electric vehicle. The vehicle includes at least one battery, at least one motor for driving the vehicle, a joystick for selecting the motor speed, and a control circuit. The control circuit includes a power relay having relay contacts. The control circuit further includes a motor speed control circuit which is operatively connected with the battery, the motor, and the joystick for controlling the motor speed in accordance with the joystick selected speed. The motor speed control circuit passes electric power through the relay contacts to the motor. A low battery power sensing circuit senses whether the battery has become discharged below a preselected to stored power level. The low battery sensor is operatively connected with the motor speed control circuit to cause the motor speed control circuit to stop supplying electric power to the motor through the relay contacts.

In accordance with a third aspect of the present invention, there is provided an electric vehicle including an electric power supply, left and right motors, a joystick, first and second combining means, and right and left motor speed control circuits. The joystick is connected with a speed control means for producing a selected vehicle speed signal which varies with a selected vehicle speed and is connected with a vehicle direction control means for producing a selectecd vehicle direction signal which varies with a selected deviation in vehicle direction from straight. The first combining means combines the selected vehicle speed signal and the selected vehicle direction signal to produce a right motor speed signal. The second combining means combines the selected vehicle speed signal and the selected vehicle direction signal to produce a left motor speed signal. The right motor speed control circuit controls the right motor speed in accordance with the right motor speed signal. The left motor speed control circuit controls the left motor speed in accordance with the left motor speed signal.

In accordance with a fourth aspect of the invention, there is provided an electric vehicle comprising at least one battery, a motor, a motor speed control circuit, an on-off switch means, and an off delay means. The motor speed control circuit includes a reference signal means for producing a reference signal which varies with a selected motor speed, a limiting circuit for limiting the rate of change of the reference signal, and a variable power regulator for regulating the amount of power supplied from the battery to the motor in accordance with the reference signal. The on-off switch means selectively passes electric power from the battery to at least the reference signal means, the limiting circuit, and the motor. The off delay means continues to provide electric power to the limiting circuit after the on-off switch means is turned off. In this manner, the reference signal is brought to zero speed in accordance with the limiting circuit rate of change decelerating the vehicle to a controlled stop.

A primary advantage of the present invention is that it accurately controls the actual speed of the wheelchair. The circuit automatically compensates for the different power requirements of the motor when the chair encounters uneven terrain and other speed affecting conditions. The circuit provides automatic braking when the actual speed of the chair exceeds the selected speed.

Another advantage of the present invention is that the direction is changed and the speed is increased or decreased gradually and smoothly, even if the joystick is operated erraticly or suddenly. Sudden reversals, acceleration, and lurching are eliminated.

Yet another advantage of the present invention is that low or discharged batteries are prohibited from causing erratic handling.

Still other advantages will become apparent upon reading and understanding the following detailed description of the preferred embodiment.

BRIEF DESCRIPTION OF THE DRAWINGS

The invention may take form in various parts and arrangements of parts. The drawings are for purposes of illustrating a preferred embodiment of the invention only and are not to be construed as limiting it.

FIG. 5 is a top view of a joystick means in accordance with the present invention;

FIG. 6 is an inside view of the top of a joystick means housing in accordance with the present invention;

FIG. 7 is a side elevational view of the joystick means housing of FIG. 5;

DETAILED DESCRIPTION OF THE PREFERRED EMBODIMENT

Figure 1:
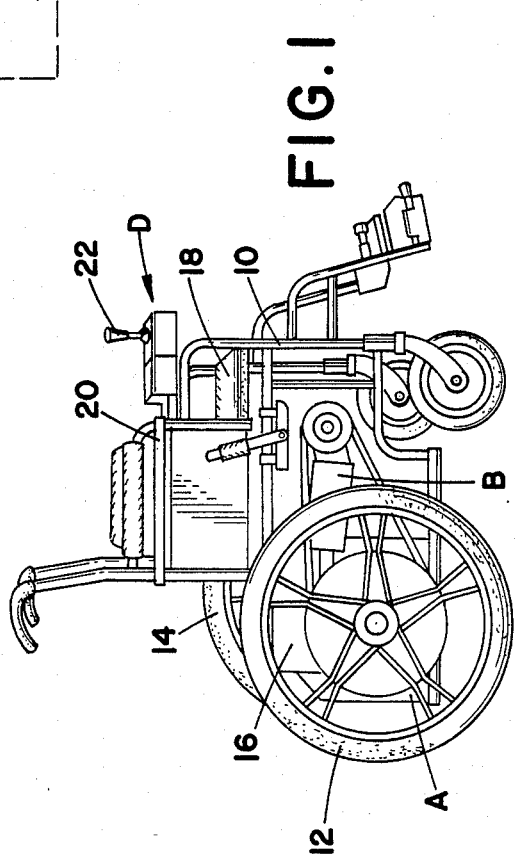
FIG. 1 is a diagrammatic illustration of an electric wheelchair in accordance with the present invention.
Figure 2:
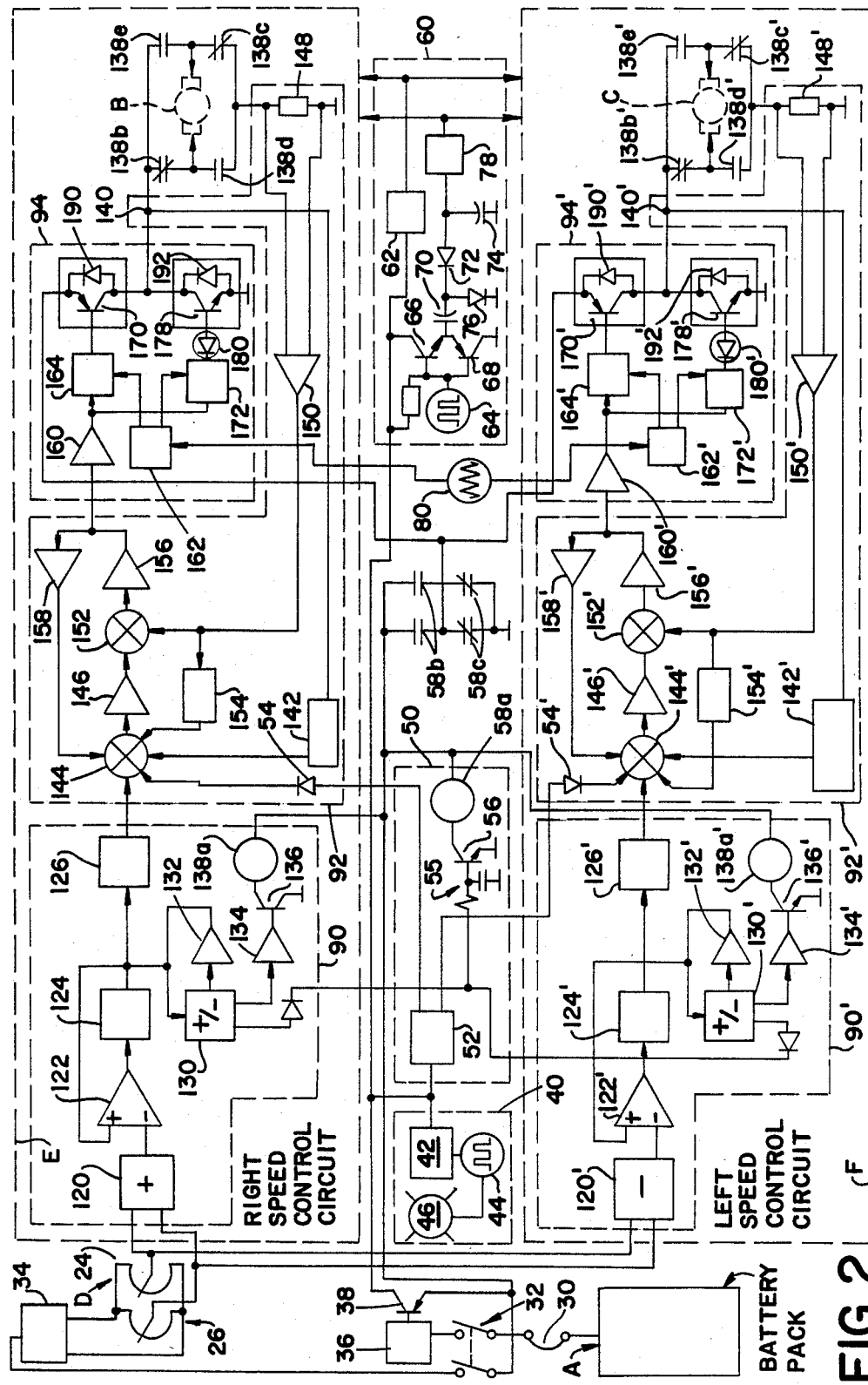
FIG. 2 is a schematic diagram of the electrical circuit of the electric wheelchair of FIG. 1, highlighting the speed control circuits.

With reference to FIGS. 1 and 2, the electric wheelchair has a battery pack A which supplies power to right and left DC electric motors B and C, respectively. The speed and direction of the wheelchair is selected by positioning a speed and direction selector or joystick means D. Right and left speed control circuits E and F are physically mounted above the battery pack and are operatively connected with the battery, electric motors and the joystick means for controlling the speed and direction of the motors such that their actual speed strives to match the selected speed.

With particular reference to FIG. 1, the wheelchair has a frame 10 to which right and left driving wheels 12 and 14, respectively, are rotatably mounted. A shelf or other support means is positioned between the wheels for supporting the battery pack A. The right motor B is mounted on the frame and connected by a belt drive with the right driving wheel 12. The left motor C is mounted on the frame and is connected by a belt drive with the left driving wheel 14. Because the motors perform both braking and acceleration functions, clutch and mechanical brake mechanisms are not required. Disposed above the battery pack is a housing 16 for receiving plug-in circuit boards on which the control and other electrical circuits are disposed. Above the housing 16 and motors is an operator supporting seat 18. The joystick means D, which may be mounted at any convenient location, is most commonly mounted in conjunction with an arm support 20.

The joystick means includes a control lever 22 which is pivotally mounted for 360° of motion in the horizontal plane. A speed control means 23 including a speed control potentiometer 24 is mounted to be controlled by fore and aft joystick movement and a direction control means 25 including a direction control potentiometer 26 is mounted to be controlled by side to side joystick movement. With this arrangement, pushing the joystick straight forward or pulling it rearward causes the speed control means 24 to produce a selected vehicle speed signal whose amplitude varies in proportion to the selected speed. In the preferred embodiment, the polarity of the selected vehicle speed signal denotes forward or reverse movement. Moving the joystick to the side causes the direction control means 26 to produce a selected vehicle direction signal whose amplitude varies in proportion to the selected deviation of the vehicle direction from straight ahead or rearward. In the preferred embodiment, the polarity of the selected vehicle direction signal denotes left or right movement.

By moving the joystick with various combinations of fore and aft and side to side motion, the wheelchair can be turned at various speeds and with various radii of curvature or pivoted in one spot.

With reference to FIG. 2, the battery pack A includes one or more batteries with a relatively high ampere-hour rating. In the preferred embodiment, the battery pack includes a pair of lead-acid automotive-type batteries connected in series to provide a voltage supply in the 22 to 30 volt range. A manual circuit breaker 30 is connected in series between the battery pack and the remaining electrical circuitry to protect it from electrical malfunctions. The circuit breaker is positioned for easy access to the user to allow easy and immediate resetting after a malfunction has occurred. A manual power switch 32 selectively connects and disconnects the battery pack A with the remaining electrical circuitry. More specifically, the manual switch 32 provides electric power to the speed and direction control potentiometers through a voltage regulator 34. The manual switch 32 also supplies power to an off delay circuit 36, which, in turn, supplies power to the remaining control circuitry. The off delay circuit rapidly gates a transistor 38 conductive when the manual switch 32 is closed. When the manual switch is opened the off delay circuit holds the transistor conductive for a preselected delay period, e.g. a few seconds, before gating it non-conductive. In this manner, opening the manual switch 32 immediately removes power from the speed and direction control potentiometers 24 and 26 causing the selected vehicle speed and direction signals to go to zero. The other control circuitry continues to receive power during the delay period to bring the vehicle, if moving, to a controlled stop.

A power indicator circuit 40 indicates whether an appropriate voltage is being supplied to the circuitry from the battery pack. The indicator circuit includes a comparator 42 and a gated, square wave oscillator 44. The comparator 42 compares the magnitude of the battery pack voltage with a reference voltage. When the battery voltage is greater than the reference voltage, the comparator output forces the square-wave oscillator 44 to a non-oscillating state which causes an indicator lamp 46 to glow continuously. When the battery pack voltage drops below the reference voltage, the output of comparator 42 allows the gated oscillator 44 to oscillate which causes the indicator lamp 46 to flash. Thus, the indicator circuit 40 indicates when the power is on as well as when the batteries have become discharged below a safe area. In the preferred embodiment, the fully charged battery pack has a 24 volt output and the oscillator reference voltage is 22 volts.

A low voltage lockout circuit 50 output is a safety feature which disables the wheelchair when the battery pack voltage drops below a safe operating range. When the battery voltage drops sufficiently, it fails to bias some of the electrical components to their normal, linear operating range. Thus, a partially discharged battery can cause erratic operation of the control circuits. In the preferred embodiment, the low voltage lockout circuit disables the wheelchair when the battery pack is discharged below 18 volts. The low voltage lockout circuit includes a low battery power sensing circuit, in the preferred embodiment a low voltage sensing circuit 52 which compares the voltage from the battery pack with a preselected lockout voltage. When the lockout voltage exceeds the battery pack voltage, the low voltage sensing circuit 52 produces a speed override signal through diodes 54 and 54' to the right and left speed control circuits to stop the motors regardless of the joystick position. After a short delay imposed by capacitor 55 or other delay means to allow time for the speed control circuits to terminate the flow of electric power to the motor, the low voltage sensing circuit 52 grounds the base of a transistor 56 to block current from flowing through a coil 58a of a power relay 58. This prevents the power relay 58 from being actuated or if actuated, causes it to drop out. In this manner, normally open contacts 58b are forced to their normally open state blocking power to the motors and normally closed contacts 58c are forced to their normally closed states grounding the motors.

A voltage regulator 60 provides a regulated positive 12 volts DC and negative 12 volts DC for biasing the various circuit components. The positive 12 VDC bias is produced with a conventional series regulator 62. The negative 12 VDC bias is derived from the positive output of the battery rather than the negative battery pack output which is grounded. An oscillator 64 alternately gates an NPN transistor 66 and a PNP transistor 68 which alternately charges and discharges a capacitor 70. A diode 72 allows the capacitor 70 to draw a second capacitor 74 to a negative potential when the capacitor 70 is discharged by transistor 68, but blocks the charge drawn to capacitor 70 from returning to the capacitor 74 as the transistor 66 charges the capacitor 70 through a second diode 76. A conventional series regulator 78 regulates the negative voltage drawn on the capacitor 74 to the −12 VDC bias.

An oscillator 80, which is discussed in detail below, provides an oscillating power reference signal for both the right and left speed control circuits. In the preferred embodiment, this oscillator signal is a triangular-wave in the range of 350 to 400 hertz with a six volt peak.

With continued reference to FIG. 2, the right speed control circuit E and the left speed control circuit F are substantially identical. To facilitate understanding of the invention, like parts in the left speed control circuit F are marked with the same reference numeral as the corresponding part and the right speed control circuit E but followed by a prime ('). Only the right speed control circuit E is described in detail and it will be understood that, unless noted otherwise, this description applies equally to the left speed control circuit F.

The speed control circuit includes a reference signal means 90 which receives the vehicle speed and direction signals from the joystick D and produces a reference signal whose magnitude varies with a corresponding right (left) motor selected speed. When the vehicle is moving straight forward the selected vehicle and motor speeds are the same. However, when the vehicle is turning one of the selected motor speeds is greater than the selected vehicle speed and the other is less than the selected vehicle speed. In this manner, the vehicle moves through a turn at substantially the selected vehicle speed. An actual and selected motor speed comparing means or circuit 92 compares selected and actual right motor speeds and produces a variance or speed error reference signal which varies with the difference between them. A variable power regulator 94 is controlled by the difference or speed error reference signal from the speed comparing circuit 92 to regulate the amount of power to the drive motor in a manner which tends to cause the actual and selected motor speeds to match.

Figure 3:
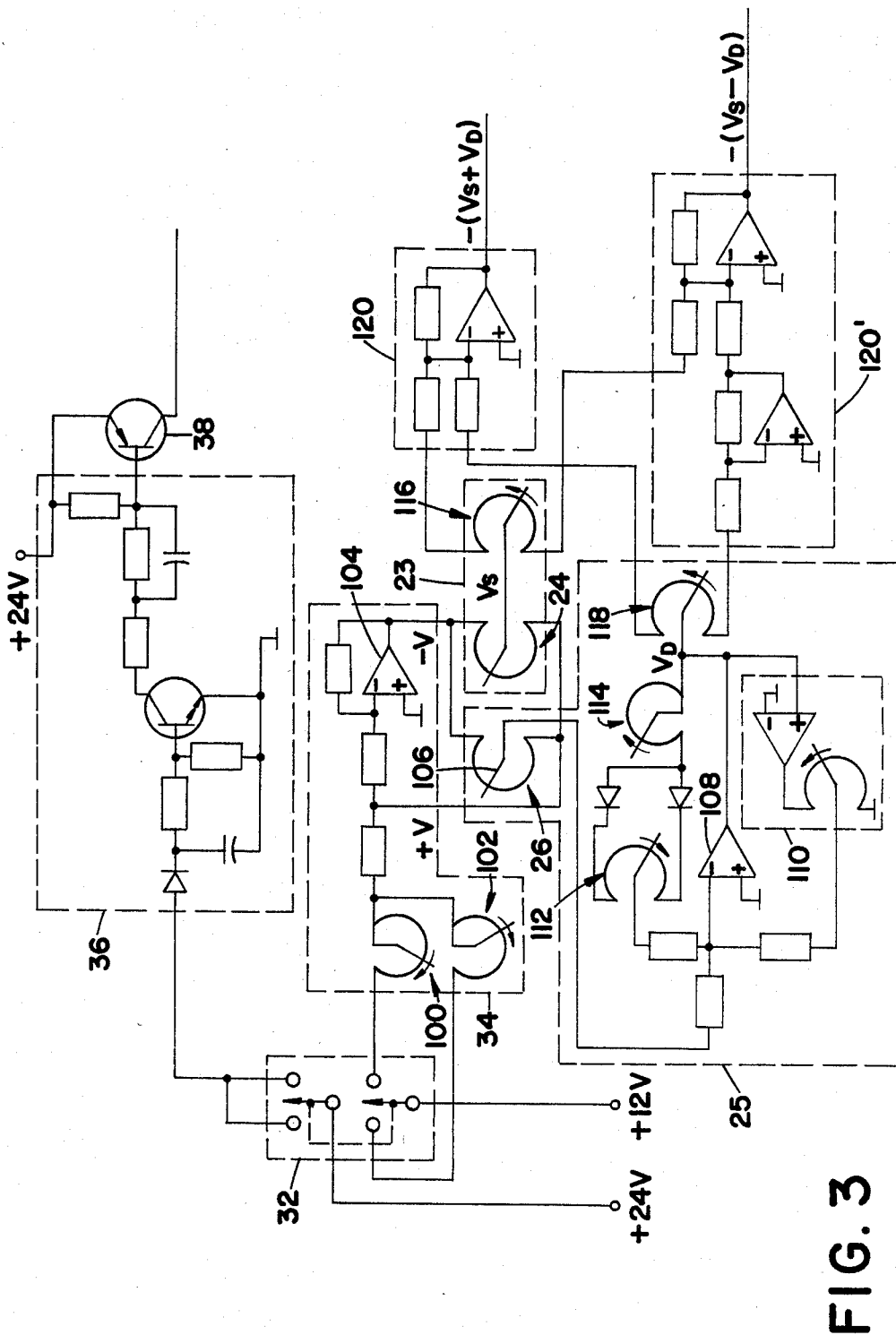
FIG. 3 is a detailed circuit schematic of the joystick electronics of the circuit of FIG. 1.

With primary reference to FIG. 3 and secondary reference to FIG. 2, the manual switch 32 is a 3-way switch which includes an off, low speed range, and high speed range positions. In the low speed range position, the manual switch provides electric power to a low speed range adjustment potentiometer 100 of voltage regulator 34. In the high speed range position, the manual switch provides power to a high speed range adjustment potentiometer 102. The inverting input of a unity gain amplifier 104 is connected with the high and low speed range adjustment potentiometer to provide balanced positive and negative reference voltages to be applied to either side of the vehicle speed and direction control potentiometers 24 and 26. The direction control means 25 includes wiper or sliding contact 106 of the direction control potentiometer which is connected with an inverting amplifier 108 which inverts the potential from the direction potentiometer. A directional deadband selection means 110 such as an adjustable hysteresis amplifier, feeds back a portion of the output of amplifier 108 to its input. This obliterates relatively small signals from the wiper 106 to allow a limited amount of side to side movement of the joystick without producing a turning signal. The directional deadband means is adjustable to provide greater latitude for spastic or otherwise uncoordinated patients and a smaller deadband for highly coordinate patients. A joystick balance potentiometer 112 provides a ready correction for any mechanical imbalance in the mounting of the joystick assembly or the mechanical connection of the control lever with the potentiometer wiper 106. In normal usage, the joystick balance potentiometer 112 is adjusted such that the joystick control lever is vertical when it is in the center of the turning deadband. A directional sensitivity adjustment 114 adjusts the magnitude of the direction signal from the amplifier 108. Again, to accommodate patients with different degrees of coordination, the sensitivity adjustment 114 allows the control to be adjusted such that a relatively large or relatively small amount of joystick control lever motion is required to produce a given amount of turning.

A speed balance adjustment means 116 is connected with the vehicle speed potentiometer to assure that both the left and right motors respond the same to a given vehicle speed signal ($V_s$). The speed balance adjustment means 116 is adjusted until both the left and right motors rotate in the same direction with the same angular velocity for a given vehicular speed signal. A direction balance adjustment 118 provides an adjustment to insure that the left and right motors both respond the same to a given direction signal ($V_D$). The direction balance adjustment 118 is adjusted until for a given direction signal, generally the maximum possible direction signal, both rotate with the same magnitude of angular velocity but in opposite directions. A first combining means 120 additively combines the selected vehicle speed signal with the selected vehicle direction signal and inverts the sum to produce a selected right motor speed signal ($-(V_s+V_D)$). Analogously, a second combining means 120' substractively combines the selected vehicle speed signal with the selected vehicle direction signal and inverts the difference to produce a selected left motor speed signal ($-(V_s-V_D)$). It is to be appreciated that although convenient and preferred to use a change of polarity to designate the change from forward to reverse or between left and right turning, it is not required.

Figure 4A:
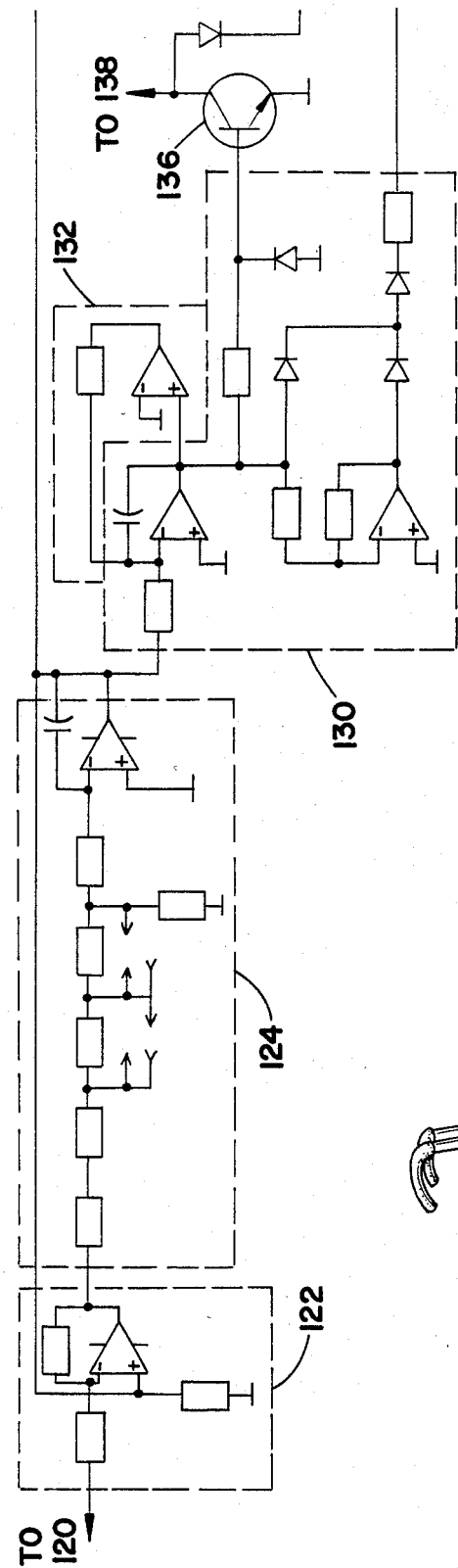
FIGS. 4A and 4B are detailed circuit schematics with exemplary component magnitudes of the right speed control circuit of FIG. 2.
Figure 4B:
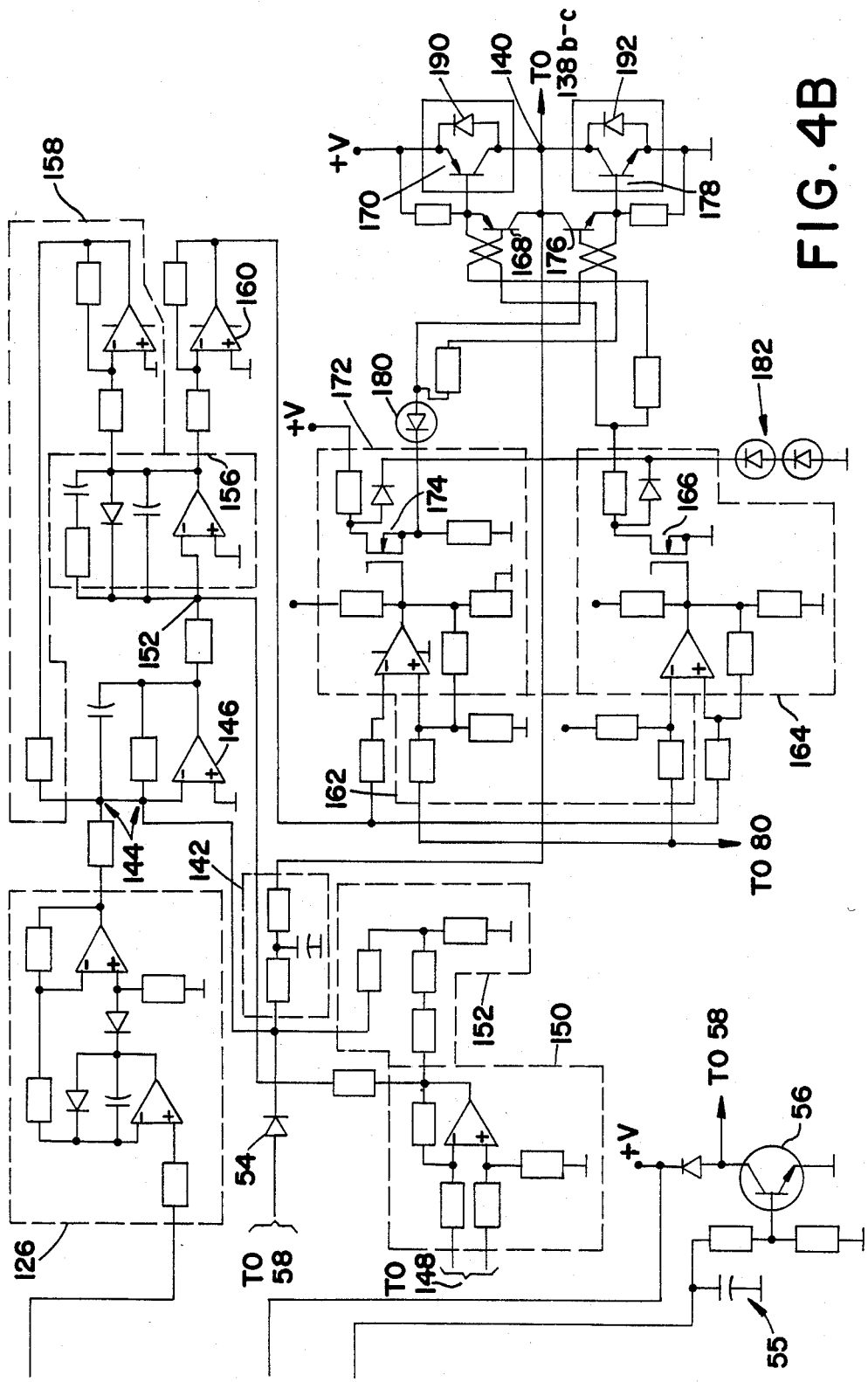

With primary reference to FIG. 2 and secondary reference to FIGS. 4A and 4B, the selected right motor speed signal from the speed and direction signal combining means is amplified by a first amplifier 122. The selected motor speed signal from the amplifier 122, in the preferred embodiment, has a positive polarity to indicate forward motion, negative polarity to indicate reverse motion, and a magnitude to indicate the selected speed. A limiting circuit 124 limits the rate of change of the selected motor speed signal which limits the acceleration and deceleration of the wheelchair. Specifically, the output of the limiting circuit is a reference signal which approaches its input exponentially. The limiting circuit input is connected with the amplifier 122. Optionally, the acceleration and deceleration rate may be made selectable with selectably adjustable resistances. An absolute value circuit 126 produces a negative analog output which varies directly with the magnitude of its input and independent of the polarity of its input. The absolute value circuit 126 causes the reference signal to vary in magnitude with the selected motor speed as adjusted by the limiting circuit 124 without regard to the selected direction or polarity.

A direction control circuit or polarity detector 130 detects the polarity of the reference signal from the limiting circuit 124. A deadband circuit including a hysteresis amplifier 132 feeds back a portion of the reference signal received from the limiting circuit to create a deadband. Specifically, the deadband circuit has a preselected neutral or zero output when its input receives a voltage in a preselected range, such as from plus one volt to minus one volt, and has an output that varies with the input outside the preselected range. When the reference signal from the limiting circuit 124 exceeds the deadband range in either the positive or negative direction, it gates the transistor 56 to its conductive position which actuates the power relay 58. When the magnitude of the reference signal from the limiting circuit 124 exceeds the deadband region in the negative or reverse direction, the direction control circuit 130 through an isolation amplifier 134 gates a transistor 136 to its conductive position to actuate a right motor reversing relay 138. Specifically, when the transistor 136 becomes conductive, power flows through the reversing relay coil 138a causing normally closed reversing relay contacts 138b and 138c to open and normally open reversing relay contacts 138d and 138e to close to reverse the polarity of the voltage, if any, which is applied to the motor.

The comparing circuit 92 detects the actual speed by detecting an electrical condition of the armature of the motor. The armature voltage and current, for example, both vary with the actual speed of the motor. A voltage detector detects the voltage across the armature by detecting the voltage at node 140. More specifically, a predetermined portion of the average potential across the armature, i.e. at node 140, is fed back by a filter or averaging means 142. A first subtractive combining means or summing node 144 combines the averaged armature voltage and the reference signal to produce a first difference signal from the absolute valve circuit 126. In the preferred embodiment, the absolute value circuit causes the reference signal to be negative and the average voltage detected at node 140 is positive, whereby their sum, the difference reference signal, varies with the difference between the actual and selected speeds. The first difference reference signal is amplified by an amplifier 146. The summing node 144 is also connected with the low battery sensing circuit 52 to be grounded in response to a low battery voltage.

The speed comparing circuit 92 also includes an armature current detector for detecting the current flowing through the armature of the motor. The armature current detector includes a small resistance 148, on the order of a hundredth of an ohm, which is connected between the armature motor and ground. The armature current flows through the resistor 148 causing a small but measurable voltage drop which varies with the armature current. The voltage drop is scaled and the polarity inverted by an armature current amplifier 150. The relative gains of amplifiers 146 and 150 are selected to limit the armature current to a preselected maximum. Specifically, the output of amplifier 146 which corresponds to the maximum possible difference reference signal is selected to be equal in magnitude to the output of amplifier 150 which corresponds to the preselected maximum armature current. The first difference reference signal from amplifier 146 and the armature current signal from amplifier 150 are subtractively combined at a second subtractive combining means or summing node 152.

A compensation circuit 154 feeds back a portion of the armature current signal to the first subtracting means or summing node 144. The greater the amount of feedback provided by the compensation means 154, the more sensitive the circuit is to small differences between the actual and selected speeds. If too great a part of the armature current signal is fed back to the first subtracting means, the circuit becomes too sensitive and the wheelchair reacts suddenly to small changes between the actual and selected speeds. If too small a part of the armature current signal is fed back by the compensation means 154, the selected and actual speeds can vary widely before the control circuitry reacts to bring them back into conformance. Thus, the amount of feedback is a trade-off to be selected to meet the operators expectations of good speed maintenance and smooth operation.

The second summing node 152 compares the first difference reference signal and the armature current signal by subtractively combining them to produce a second difference reference signal or error reference signal whose magnitude is adjusted by a current error amplifier 156. A deadband circuit comprising a hysteresis amplifier 158 inverts and feeds back a fraction of the error reference signal to the first subtracting means 144 to form a deadband around the neutral or no speed zone. The output of the current error amplifier 156 can, of course, be positive or negative depending on whether the actual speed exceeds or is exceeded by the selected speed.

The variable power regulator 94 includes an inverting amplifier 160 which inverts the polarity of the error reference signal. A deadband circuit 162 provides a small DC bias to the triangular-wave or oscillating signal from the oscillator 80. A first pulse width modulator 164 compares the magnitude of a signal which it receives on a first of its inputs with the magnitude of a signal which it receives on the second of its inputs. The first of its inputs is connected with the inverting amplifier 160 and the second of its inputs is connected with the oscillator 80 through the deadband circuit 162. In this manner, the first pulse width modulator 164 generates a first pulse train whose periodicity varies with the oscillating signal and whose pulse width varies with the comparison with the signals received on its inputs. More specifically, the first pulse width modulator gates a first V-moss field effect transistor 166 conductive to produce a ground pulse of the first pulse train when the oscillating signal exceeds the error reference signal. Between ground pulses, the first pulse train has a positive potential. Each ground pulse of the first pulse train gates a first control transistor 168 non-conductive which gates a pull-up transistor 170 conductive.

A second pulse width modulator 172 compares the magnitude of the signals received on its first and second inputs. Its first input is connected with the deadband circuit 162 and its second input is connected with the inverting amplifier 160. The second pulse width modulator performs the opposite comparison than the first pulse width modulator. That is, the second pulse width modulator produces a second pulse train whose periodicity varies with the oscillating signals and whose pulse width varies with the comparison between the error reference signal and oscillating signals. More specifically, the second pulse width modulator 172 gates a second V-moss field after transistor 174 conductive to produce a ground pulse of the second pulse train when the error reference signal exceeds the oscillating signal. Between ground pulses, the second pulse train has a positive potential. Thus, the second pulse train is high when the first pulse train is low and the first pulse train is high when the second pulse train is low. The D.C. offset which the deadband circuit provides causes both pulse trains to be high momentarily after each positive pulse. Each ground pulse of the second pulse train gates a control transistor 176 non-conductive which gates a pull-down transistor 178 conductive. The deadband circuit 162 provides a deadband between the regions in which the pull-up and pull-down transistors are gated conductive to insure that they are not gated simultaneously. Each time the pull-up transistor 170 is gated conductive, it pulls up the voltage at node 140 to the battery pack voltage. Each time the pull-down transistor 176 is gated conductive, it connects the node 140 with ground. This insures that the voltage at node 140 is a square-wave whose peak amplitude is the battery voltage and whose minimum amplitude is ground. The amount of power supplied to the motor by the variable power regulator 92 is determined by the relative duration of the peak amplitude to the minimum amplitude. The longer the pull-up transistor 170 remains gated compared with the pull-down transistor 176, the more power is supplied to the motor. When the pull-up transistor 170 changes state from conductive to non-conductive, there is a tendency to produce negative voltage spikes at the base of the pull-down transistor 178. A unidirectional blocking means such as a voltage clamping diode 180 prevents the negative spikes from changing the state of the second V-moss transistor 174. A second voltage clamp 182 fixes the potential across the first and second V-moss transistors for greater stability.

To slow the motor and wheelchair, the control circuit channels current generated by the motor in its generating mode into the battery pack to recharge the battery. This type of braking is denoted herein as "regenerative braking", although others have used "regenerative braking" as a synonym for "dynamic braking" in which the generated current is dissipated by a resistor. When a slowdown of the motor is called for, the duty cycle of the pull-down transistor 178 increases and the pull-up transistor 170 duty cycle decreases. This causes the current direction in the armature to reverse and thus reverse the torque direction and slow down the chair. When the pull-up transistor 170 turns off, the armature current that was flowing through the armature inductance will continue to flow but the path is through a diode 190, the power relay contacts 58b, and to the battery pack. This returns some of the braking current to the battery. This is denoted as regenerative braking or regeneration. A "free-wheeling" or "flyback" diode 192 provides a path for the armature current when the pull-up transistor 170 shuts off. Dynamic braking of the motor is provided when the power relay 56 is deenergized. The path of the braking current is dependent on the motor generated voltage polarity. Specifically, when junction 140 is positive, the path to ground is through diode 190 and contacts 58c and when the junction 120 is negative, the path is through diode 192.

By way of example of the operation of the above described device, assume that the operator has pushed the joystick forward speed. The potentiometer 24 is moved off-center and the combining means 120 and amplifier 122 produce a voltage of several volts, e.g., 5 volts. The limiting circuit output rises exponentially to 5 volts. When the limiting circuit 124 output reaches the limit of the deadband region, e.g., 1 volt, it causes the power relay 58 to be actuated. The power relay applies the battery pack voltage to the collector of the pull-up transistor 170. The absolute value circuit 126 strips the polarity from the motor speed reference signal and provides it with a negative polarity.

The speed reference signal, which is exponentially approaching $-5$ volts, is combined at the summing node 144 with the average armature voltage at the node 140 and the deadband voltage from hysteresis amplifier 158. Because the joystick has just been actuated and the wheelchair is not yet moving, the latter voltages are, at first, essentially zero. As the potential or the difference signal at the summing node 144 increases, its amplitude is adjusted by amplifier 146. The difference signal is combined at summing node 152 with the output of amplifier 150 which is zero when the wheelchair is stationary. The potential at the summing node 152, the speed error reference signal, has its amplitude adjusted and its polarity inverted by amplifiers 156 and 160.

When the motor speed reference signal from the absolute value circuit 126 is very close to zero, the voltage fed back by the hysteresis amplifier 158 balances out the speed reference signal. When the speed reference signal increases above the deadband region imposed by hysteresis amplifier 158, a non-zero speed error reference signal is produced. The speed error reference signal is compared by the first pulse width modulator 164 with the signal from the oscillator 80. This comparison causes a pulse train which periodically gates the pull-up transistor 170 causing power to flow from the batteries to the motor armature which causes the wheelchair to start moving forward. Between gating the pull-up transistor 170 conductive, the second pulse width modulator 172 gates pull-down transistor 178 conductive connecting the input to the motor to ground.

Gating the pull-down transistor 178 conductive causes a voltage at the node 140 and a current flow through the motor armature and resistor 148. The summing node 144 combines the deadband voltage from the hysteresis amplifier 158 with the average voltage feedback from node 140 and a feedback voltage through resistor 154 which varies with the current flow through the armature. As the speed of the wheelchair approaches the selected speed, the potentials at the summing nodes 144 and 152 tend toward zero. This reduces the amplitude of the speed error reference signal which is compared with the oscillating signal from oscillator 80. As the speed error reference signal decreases, the width of the gating pulses in the pulse train produced by the first pulse width modulator 164 similarly decreases. This reduces the amount of power supplied to the motor. If the width of the pulses in the pulse train from the first pulse width modulator 164 becomes too narrow, i.e., the amount of power supplied to the motor is too small to maintain the desired speed, the feedback signals from the armature voltage node 140 and the armature current amplifier 150 tend to drop causing the speed error reference signal to increase. In this manner, an equilibrium condition is reached when the motor reaches the selected speed.

If the wheelchair is to be turned left, the joystick is moved to the left and forward shifting the direction potentiometer 26 off center. The combining means 120 increases the selected vehicle speed signal with the selected vehicle direction signal and the combining means 120′ decreases the selected vehicle speed signal with the selected vehicle direction signal. This results in the magnitude of the right motor speed reference signal from the right reference signal means 90 exceeding the left motor speed reference signal from the left reference signal means 90′. The left and right motor speed reference signals are each processed as described above resulting in the right motor rotating faster than the left motor causing a left turn.

If in use in a wheelchair which encounters an uphill grade, the motor starts to slow down decreasing the amplitude of the armature voltage and current feedback signals. This tends to increase the speed error signal which increases the amount of power delivered to the motor thus bringing the motor back to its selected speed. If the grade changes toward a downgrade, the chair tends to start rolling more quickly. This tends to increase the armature voltage and current feedback signals which reduces the amplitude of the speed error signal. This in turn reduces the amount of power supplied to the motor. If a sufficient downgrade is encountered, the speed error signal will change polarity causing the pull-up transistor 170 to reduce its duty cycle and the pull-down transistor 178 to increase its duty cycle. This causes a reversal of the current flow in this motor. The current generated by the motor then flows alternately through the pull-down transistor 178 to ground and through diode 190 to the battery to cause controlled regenerative braking.

With reference to FIGS. 5, 6, and 7, the joystick means D includes a housing 200 which is mounted in a convenient location on the wheelchair. The joystick 22 is movably mounted to the housing 200. The joystick 22 has a neutral position, vertical and centered in the preferred embodiment, which indicates no forward movement, reverse movement, or turning movement of the wheelchair has been selected. From the neutral position, the joystick is movable over a range of forward and rearward positions to indicate the selected amount of forward and rearward speed for the right and left motors; and the joystick is movable over a range of side to side positions to indicate a selected turning radius. More specifically, the front to rear movement of the joystick moves the wiper of the speed control potentiometer 24 and the side to side movement of the joystick controls the wiper of the direction control potentiometer 26. Thus as described above, the right speed control circuit E and the left speed control circuit F produce selected right and left motor speed signals. The magnitude of the right and left motor speed signals vary with the forward and rearward position of the joystick and the relative magnitude of the right and left motor speed signals vary with the side to side position of the joystick.

With particular reference to FIG. 6, the housing 200 has a recess 202 for receiving a mask 204. The mask has a plurality of edges defining a central aperture 206 through which the joystick passes. Releasable mounting means 208 releasably mount the mask in the housing recess 202. In this manner, masks with other shape central apertures can be substituted. The abutting interaction of the joystick and the aperture defining edges of the mask limit the range of movement of the joystick. In this manner, the maximum forward speed, maximum rearward speed, and the minimum turning diameter at various forward and rearward speeds are limited. A rubber boot 210 allows movement between the joystick and the housing 200 while sealing the interior of the housing from dirt and the like.

Figure 8:
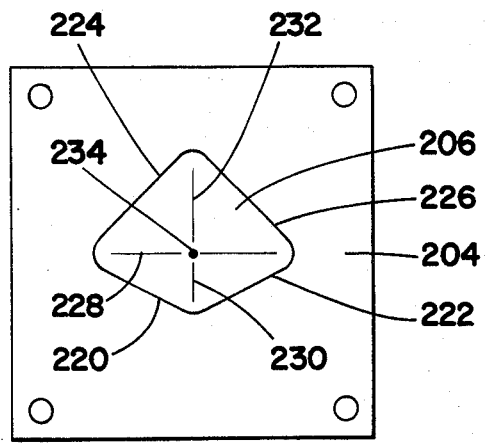
FIG. 8 illustrates a joystick motion limiting mask in accordance with the present invention.

With reference to FIG. 8, in a preferred embodiment, the mask 204 has aperture defining edges which limit the maximum rearward speed and which limit the minimum turning radius particularly toward the maximum rearward and forward speeds. In the embodiment of FIG. 8, the aperture defining edges are disposed along the equal sides 220 and 222 of a first isosceles triangle and along the equal sides 224 and 226 of a second isosceles triangle. The first and second isosceles triangles have a common base 228 which is disposed along the side to side range of motion. The triangles have altitudes 230 and 232 which lie along the forward and reverse range of motion. The intersection of the altitudes and the common base defines a neutral position 234 at which no forward, reverse, or turning motion is indicated. Movement of the joystick from the neutral position 234 toward either side decreases the turning radius and moving the joystick from the neutral position along the altitudes increases the forward or reverse speed. By selecting isosceles triangles such that the first isosceles triangle altitude 230 is less than the second isosceles triangle altitude 232, the maximum rearward speed is limited to be less than the maximum forward speed. Further, the linear sides of the aperture limit the minimum turning radius at each selected forward and reverse speed over the turning radius which would have been selectable without the mask.

Figure 9:
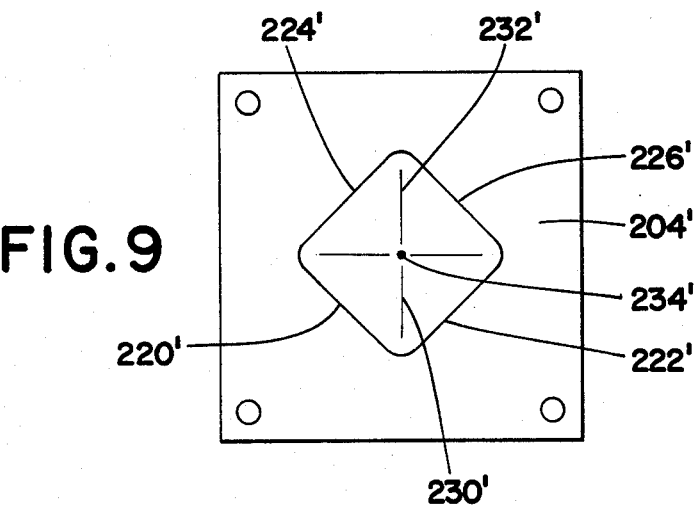
FIG. 9 illustrates an alternate embodiment of a joystick motion limiting mask in accordance with the present invention; and, FIG. 10 illustrates another alternate embodiment of a joystick motion limiting mask in accordance with the present invention.

With reference to FIG. 9, an alternate embodiment of the mask is illustrated which limits the minimum turning radius of the vehicle at higher forward and rearward speeds. In the embodiment of FIG. 9, like elements with the embodiment of FIG. 8 are denoted by the same reference numerals but follows by a prime ('). In the embodiment of FIG. 9, the rearward triangle altitude 230' and the forward triangle altitude 232' have the same magnitude. This limits the maximum forward and reverse speeds to the same magnitude. The convergence of the sides 220' and 222' of the rearward triangle prohibit the joystick from moving side to side and selecting a non-straight direction at the maximum rearward speed. The minimum turning radius is permitted only when the vehicle is standing still.

Figure 10:
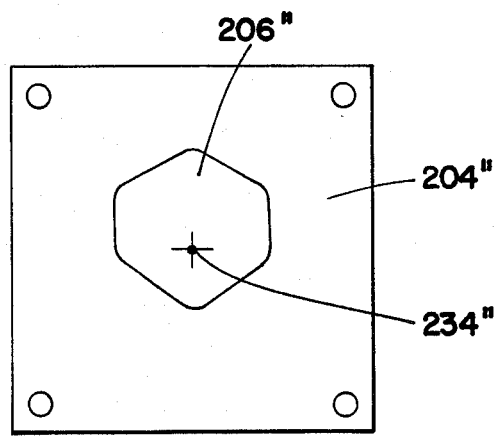

FIG. 10 illustrates yet another embodiment of a mask in accordance with the present invention. In the embodiment of FIG. 10, like elements with the embodiment of FIG. 8 are denoted by the same reference numeral but followed by a double prime (″). In the embodiment of FIG. 10, the central aperture 206″ of the mask 204″ is generally hexagonal. Further, the neutral position 234″ is selected to be rearward of the geometric center of the hexagonal. This defines a rearward isosceles triangle which confines the rearward modes of motion as described above. In the forward direction, there is a range of slower speeds at which the minimum turning radius may be selected while the vehicle is moving forward. At higher speeds, a second isosceles triangle arrangement again limits the minimum turning radius at higher speeds.

The invention has been described with reference to the preferred embodiment. Obviously, modifications and alterations will become apparent to others upon reading and understanding the specification. It is our intention to include all such modifications and alterations which come within the scope of the appended claims or the equivalents thereof.

Having thus described a preferred embodiment, we now claim:

1. A plural motor speed control system for an electric vehicle comprising:
   an electric power supply;
   at least one left motor for driving a left vehicle wheel and at least one right motor for driving a right vehicle wheel, the vehicle speed being controlled by the speed of the left and right motors and vehicle direction being controlled by the relative speed of the left and right motors;
   a joystick means connected with a speed control means for producing a single selected vehicle speed signal which varies with a selected vehicle speed and connected with a separate vehicle direction control means for producing a single selected vehicle direction signal which varies with a selected deviation in vehicle direction from straight;
   a first combining means for combining the selected vehicle speed signal and the selected vehicle direction signal to produce a right motor speed signal;
   a second combining means for combining the selected vehicle speed signal and the selected vehicle direction signal to produce a left motor speed signal;
   a right motor speed control circuit operatively connected with the power supply, right motor, and the first combining means for controlling the right motor speed in accordance with the right motor speed signal; and, a left motor speed control circuit operatively connected with the power supply, left motor, and the second combining means for controlling the left motor speed in accordance with the left motor speed signal.

2. The speed control system as set forth in claim 1 wherein the vehicle direction control means includes a joystick balancing circuit for adjusting the selected vehicle direction signal such that the position of the joystick that causes the selected vehicle direction signal which indicates no turning moition is adjustable.

3. The speed control system as set forth in claim 1 wherein one of the first and second combining means subtractively combines the selected vehicle direction and speed signals and the other additively combines the selected vehicle direction and speed signals.

4. The speed control system as set forth in claim 1 wherein the direction control means includes a direction control potentiometer having first and second resistor connections connected across a voltage supply and a movable contact connected with the deadband circuit.

5. The speed control system as set forth in claim 1 wherein the joystick means includes a joystick which is movable from a neutral position over a range of forward and rearward positions and over a range of side to side positions to indicate a selected vehicle speed and a selected vehicle direction; a first potentiometer operatively connected with the joystick and with the speed control means to indicate the forward to rearward position of the joystick and a second potentiometer operatively connected with the joystick and the speed control means to indicate the side to side position of the joystick; and joystick position limiting means for limiting the range of movement of the joystick.

6. The speed control system as set forth in claim 5 wherein the joystick motion limiting means includes a mask having an aperture which receives the joystick therethrough, abutting interaction of the joystick and the aperture defining edges of the mask limiting the range of movement of the joystick.

7. A plural motor speed control system for an electric vehicle comprising:
  (a) an electric power supply:
  (b) at least one left motor for driving a left vehicle wheel and at least one right motor for driving a right vehicle wheel, the vehicle speed being controlled by the speed of the left and right motors and vehicle direction being controlled by the relative speed of the left and right motors;
  (c) a joystick means including:
    (i) a joystick which is movable from a neutral position over a range of forward and rearward positions and over a range of side to side positions to indicate a selected right motor speed and a selected left motor speed;
    (ii) a speed control means for producing a selected right motor speed signal and a selected left motor speed signal, the magnitude of the right and left motor speed signals varying with the forward and rearward position of the joystick and the relative magnitude of the right and left motor speed signals varying with the side to side position of the joystick; and
    (iii) joystick motion limiting means for limiting the range of movement of the joystick such that at least one of the magnitude of the selected left and right motor speed signals and the relative magnitude of the left and right motor speed signals are limited, whereby at least one of the maximum forward speed, the maximum reverse speed, and the minimum turning radius of the vehicle are limited.

8. The speed control system as set forth in claim 7 wherein the joystick motion limiting means includes a mask having an aperture for receiving the joystick therethrough, abutting interaction of the joystick and aperture defining edges of the mask limiting the range of the movement of the joystick.

9. The speed control system as set forth in claim 8 wherein the aperture defining edges are disposed generally along the equal sides of a pair of isosceles triangles which have a common base.

10. The speed control system as set forth in claim 9 wherein the common base of isosceles triangles is disposed side to side and the isosceles triangles altitudes are disposed forward and rearward.

11. The speed control system as set forth in claim 10 wherein the forward disposed isosceles triangle altitude is greater in magnitude than the rearward disposed isosceles triangle altitude, whereby the maximum rearward vehicle velocity is less than the maximum forward vehicle velocity.

12. The speed control system as set forth in claim 8 wherein the mask is removable to facilitate ready replacement with another mask which has movement limiting aperture edge of a different configuration to change the limits of the range of joystick movement.

* * * * *